Figure 1:
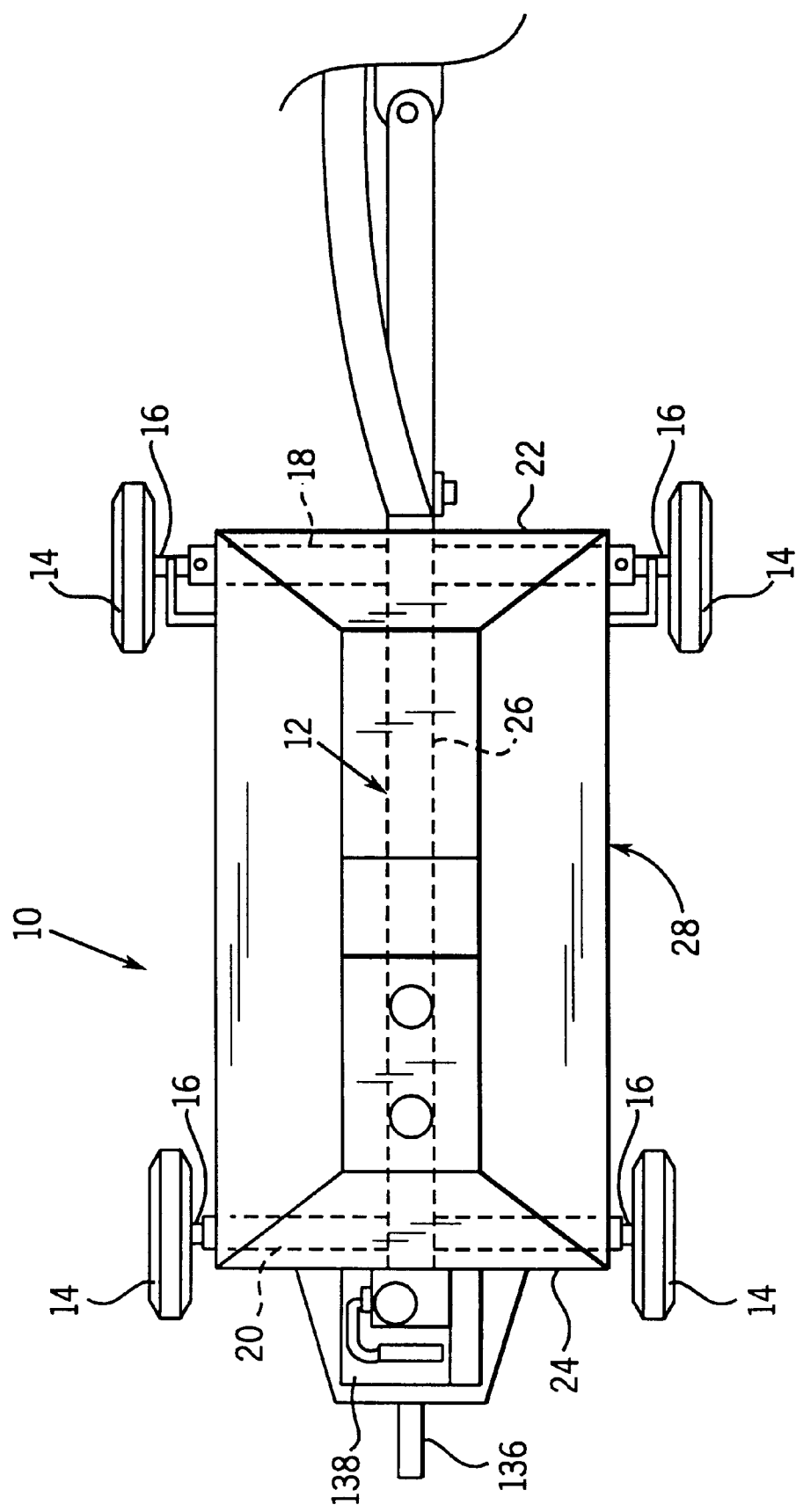

United States Patent [19]
Meyer et al.

[11] Patent Number: 5,915,312
[45] Date of Patent: Jun. 29, 1999

[54] PNEUMATIC SEED DELIVERY SYSTEM

[75] Inventors: Bradley J. Meyer; Timothy A. Murray; Noel W. Anderson; Douglas S. Prairie, all of Fargo, N. Dak.

[73] Assignee: Case Corporation, Racine, Wis.

[21] Appl. No.: 08/920,785

[22] Filed: Aug. 29, 1997

[51] Int. Cl.⁶ .................................................. A01C 15/04
[52] U.S. Cl. .............................. 111/174; 406/41; 406/197
[58] Field of Search ............................ 111/174; 406/41, 406/142, 143, 146, 194, 196, 197; 222/1

[56] References Cited

U.S. PATENT DOCUMENTS

| | | |
|---|---|---|
| 168,029 | 9/1875 | Körting . |
| 2,525,718 | 10/1950 | Parker . |
| 2,676,852 | 4/1954 | Kirkbride . |
| 2,758,564 | 8/1956 | Randall . |
| 2,955,877 | 10/1960 | Ecal . |
| 3,142,274 | 7/1964 | Winter ........................................ 111/34 |
| 3,189,230 | 6/1965 | Gillespie .................................. 222/193 |
| 3,387,746 | 6/1968 | Whipple .................................. 221/211 |
| 3,482,735 | 12/1969 | Goulter .................................... 221/211 |
| 3,548,765 | 12/1970 | Grataloup ............................ 111/178 X |
| 3,804,036 | 4/1974 | Seifert, Jr. ............................. 222/193 X |
| 4,060,181 | 11/1977 | Grataloup ................................ 222/193 |
| 4,286,530 | 9/1981 | Conley ................................ 414/526 X |
| 4,298,018 | 11/1981 | Haggard .............................. 222/630 X |
| 4,399,757 | 8/1983 | Maury ........................................ 111/34 |
| 4,473,016 | 9/1984 | Gust .................................... 222/263 X |
| 4,474,327 | 10/1984 | Mattson et al. ......................... 239/143 |
| 4,503,786 | 3/1985 | Tautfest ............................... 222/279 X |
| 4,519,525 | 5/1985 | Wunschl et al. ......................... 221/211 |
| 4,562,968 | 1/1986 | Widmer et al. .......................... 239/655 |
| 4,919,303 | 4/1990 | Boudreault .................................. 222/1 |
| 5,161,473 | 11/1992 | Landphair et al. ...................... 111/176 |
| 5,379,706 | 1/1995 | Gage et al. .............................. 111/175 |
| 5,392,722 | 2/1995 | Snipes et al. ............................ 111/174 |
| 5,515,795 | 5/1996 | Ledermann et al. ..................... 111/174 |
| 5,601,209 | 2/1997 | Barsi et al. .............................. 221/266 |

FOREIGN PATENT DOCUMENTS 287440  1/1971  U.S.S.R. .

OTHER PUBLICATIONS

Case Corporation, Concord, Inc. Pamphlet, Precision Farm Equipment, 1996.
Case Corporation Pamphlet, Air Systems, Air Seeders and Bulk Handling, 1996.
Case Corporation, Concord, Inc. Pamphlet, Air Till Drill Systems, 1996.

*Primary Examiner*—Christopher J. Novosad
*Attorney, Agent, or Firm*—Foley & Lardner

[57] ABSTRACT

A pneumatic seed delivery system is provided, including a bin with a plenum at the bottom separated from the bin by a membrane to permit the upward flow of air from the plenum into the bin, and a tube extending through a side wall of the bin to provide fluid communication from an outer surface of the bin to an inner surface of the bin. One end of the tube is disposed inside the bin and adjacent to the screen, and a second open end of the first seed distribution tube is disposed outside the bin. In this manner, seed in the bin can be propelled up the tube by forcing air into the plenum, passing the air through the membrane and through seed located between the membrane and the first open end of the tube. This seed will then move up the tube and be carried to a remote location for use. This structure may also be provided by modifying a bin with an existing metering system removable through an opening in the bottom of the bin by removing a cover from the opening, removing the metering device, and inserting a device having plenum and tube structures into the opening.

28 Claims, 12 Drawing Sheets

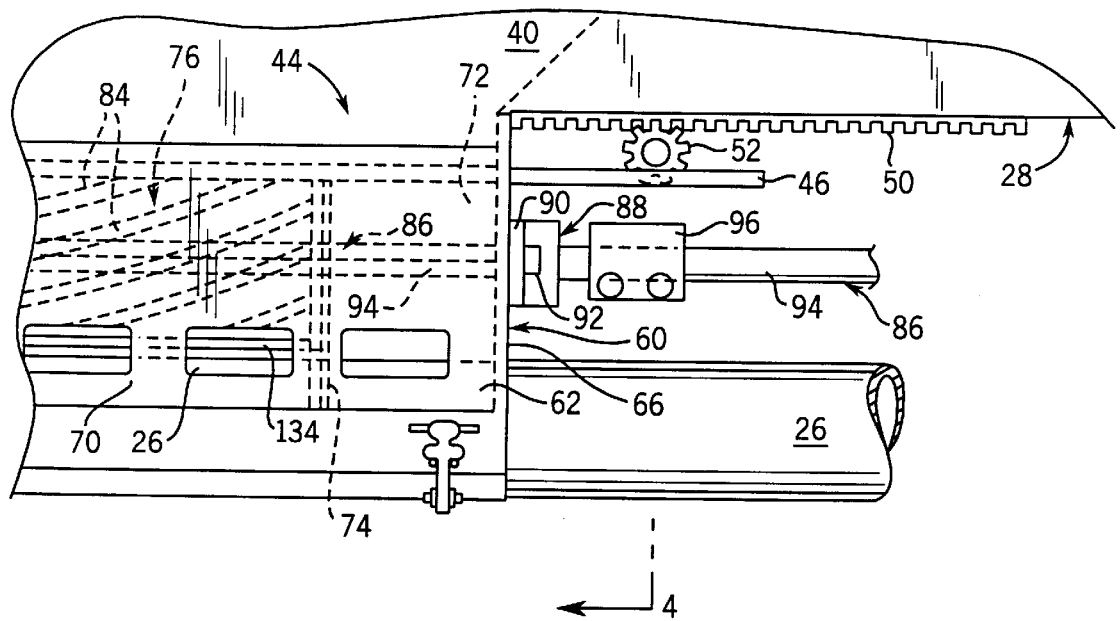

PNEUMATIC SEED DELIVERY SYSTEM

FIELD OF THE INVENTION

The subject matter of the invention relates generally to farm implements. More particularly, it relates to planters. More particularly it relates to pneumatic seed delivery systems for planters.

BACKGROUND OF THE INVENTION

In recent years pneumatic delivery systems have been employed in farm vehicles to deliver seed, fertilizer and herbicides to planters and tool bars. One such system is shown in U.S. Pat. No. 4,473,016, issued to Gust. In this system, a tractor pulls a particulate feeder or "cart" typically having two or three separate hoppers terms "bin" and "hopper" are synonyms and are used interchangeably herein) The cart, depending upon its size, may have three or four wheels and a longitudinal tube extending its length. Each hopper is typically equipped with a rotating metering cylinder disposed between that hopper and the tube to meter particulate matter (seed, fertilizer or herbicides) into the tube when the cylinder rotates. An engine or hydraulic motor on the cart drives a fan that is pneumatically coupled to the tube to blow air through the tube. The air flow in the tube accelerates the particulate matter and blows it into a series of pneumatic manifolds on the planter or tool bar (also towed by the tractor) that pneumatically distribute the particulate matter equally to a plurality of ground openers.

Seed and fertilizer may be distributed simultaneously to the tool bar by placing seed in one hopper and fertilizer in another, both of which are then metered into the tube to be sent to the pneumatic manifold distribution system on the planter. There are several drawbacks to this method, however. First, since the seed is mixed with the fertilizer in the tube, seed may be burned by the fertilizer. To prevent this in other embodiments, the tube has been subdivided into two separate air paths by placing a partition or "ribbon" down the length of the tube. The seed is then metered into one-half of the tube, and the fertilizer is metered into the other half of the tube. At the end of the tube, each of these separate partitions is directed to a separate pneumatic distribution system on the planter, rather than distributing a seed-chemical mix in a single common manifold system such as that shown in the Gust reference.

Even a dual manifold and partition arrangement has drawbacks, however. Using air in a manifold system to evenly distribute the seeds may be acceptable for durable seeds, such as wheat, but can cause problems for seeds such as canola and corn. When a manifold distribution system is used with these grains, they suffer damage when they impact the top of the manifolds and suddenly reverse direction to proceed down the tubes extending radially away from the manifold. In addition, the air flow in a manifold distribution system must be high to lift the grains up the manifolds and to cause sufficiently random turbulence to distribute seeds evenly to each of the rows. This commonly results in damage to 1–25% of the seeds.

There are additional disadvantages to a manifold distribution system for crops that require very low application rates. For example, canola, corn and sunflower seeds are deposited at a rate of between 4 and 25 pounds of seed per acre. When a metering cylinder at the bottom of a hopper is used to meter seed at this rate, the flutes must be made especially small and carefully tapered to insure that seed is introduced into the longitudinal tube evenly over time. Also, the manifold system is not able to distribute the seeds evenly when only small amounts are being applied.

It is possible to accurately meter seed flow with less damage by eliminating the manifold arrangement for pneumatically distributing seeds and replacing it with one or more mechanical metering systems such as the Cyclo unit illustrated in U.S. Pat. No. 4,519,525. In such a system, the air velocity can be reduced since air is used merely to deliver seed to the Cyclo unit and the Cyclo unit mechanically distributes seeds to each row. Providing two mechanical metering devices in series (the rotating cylinder and Cyclo unit) has drawbacks, however. The two metering systems are difficult to synchronize. Since one feeds the other, a lack of synchronization can overfill or underfill the Cyclo unit, potentially plugging it, or starving it for seeds, respectively. To prevent this problem, some method of controlling the metering rate to the Cyclo unit must be provided. Experiments have been conducted in which a sensor on the Cyclo drum signals the metering cylinder on the cart to turn on and off. Such methods, however, require the addition of a motor or other controllable apparatus to rotate the metering cylinder, and also a sensor at each Cyclo unit to sense its level of seed.

What the Applicants propose is a new apparatus for supplying grain from a portable grain bin to a grain meter that will reduce or eliminate the above disadvantages.

SUMMARY OF THE PRESENT INVENTION

In accordance with a first embodiment of the invention, a pneumatic seed delivery system is provided, including a bin adapted to contain seed, a plenum disposed at a lower end of the bin, a semi-permeable membrane disposed between the plenum and the bin to permit the upward flow of air from the plenum into the bin, and a first seed distribution tube extending through a side wall of the bin to provide fluid communication from an outer surface of the bin to an inner surface of the bin, wherein a first open end of the first seed distribution tube is disposed inside the bin and adjacent to the screen, and a second open end of the first seed distribution tube is disposed outside the bin. A second seed distribution tube may be provided extending through the side wall of the bin to provide fluid communication from an outer surface of the bin to an inner surface of the bin, wherein a first open end of the second seed distribution tube is disposed inside the bin and adjacent to the membrane, and a second open end of the second seed distribution tube is disposed outside the bin, and wherein the first and second seed distribution tubes are adapted to be separately adjusted with respect to the membrane. The side wall may be coupled to the plenum and screen. The side wall, the plenum, and the screen may also be removably coupled to the bin. The first seed distribution tube may be disposed at an angle of between 20 and 60 degrees of horizontal. The first seed distribution tube may be slidably supported in the side wall of the bin to allow the tube to be advanced toward or retracted from the screen. The first open end of the first seed distribution tube may define a first plane substantially parallel to the screen. The first open end of the first seed distribution tube may define a second plane substantially perpendicular to the longitudinal axis of the tube. The system may further include at least two wheels rotationally coupled to and supporting the bin, thereby defining a cart having a front end and a rear end. The system may also include a second bin coupled to the first bin to contain particulate matter, and a metering cylinder coupled to a lower end of the second bin to meter particulate matter received from the second bin. A longitudinal tubular member may be provided extending longitudinally between the front and the rear end of the cart below a lower portion of the first and second bins, wherein the metering cylinder is disposed below a lower portion of the second bin and above the longitudinal tubular member to meter particulate matter from the second bin into the longitudinal tubular member. The metering cylinder may be adapted to meter particulate matter at a rate of between 0 and 300 pounds per minute, and the first seed distribution tube and screen are adapted to meter seed at a rate of between 0 and 25 pounds per minute. The system may also include a flexible hose coupled to the first seed distribution tube and having an inner cross-sectional area smaller than an inner cross-sectional area of the first seed distribution tube. The cross-sectional area of the flexible hose may be at least 15% smaller than the cross-sectional area of the first seed distribution tube.

In accordance with a second embodiment of the invention, a pneumatic distribution system for distributing particulate matter is provided having a hopper with sloping internal side walls, a housing disposed at a lower end of the bin and coupled to the side walls of the hopper to permit the passage of particulate matter from the bin into the housing, the housing having an opening in a side wall thereof, and an insert including a partition having an inner and an outer surface, a first opening configured to receive a particulate matter distribution tube and a second opening adapted to conduct an air flow through the partition from the outer surface to the inner surface, a first panel coupled to and extending from the inner surface between the first and second openings and configured to be received in the housing opening and to abut an inner surface of the housing, and a membrane screen coupled to the panel and covering an opening in the panel. The insert may have a flange coupled to the partition to seal the partition against the housing opening. It may also have a latch for locking the insert into the housing opening, as well as two side panels and a bottom panel coupled to the partition to form a plenum together with the first panel, wherein the two side panels and the bottom panel are also configured to be receivable in the housing opening. A third opening may be provided in the partition to receive a second distribution tube for conveying particulate matter. The insert may have a distribution tube for particulate matter supported in the first opening in the partition and configured to be received in the housing opening as well as a particulate matter deflection plate disposed above an open end of the distribution tube. The insert may have a flexible hose coupled to a distal end of the distribution tube and having an internal cross-sectional area at least 15% smaller than an internal cross-sectional area of the seed distribution tube.

In accordance with a third embodiment of the invention, a method of modifying a particulate matter distribution system having a hopper, a housing coupled to a lower end of the hopper, a cover covering an opening in the housing, and a metering device is provided, including the steps of removing the cover, removing the metering device from the housing through the opening, inserting into the opening a plenum having a membrane in a surface thereof, and providing in the housing a first end of a particulate matter distribution tube such that a first end of the distribution tube is disposed above the membrane. This method may include the step of coupling a first end of a flexible hose to a second end of the distribution tube and the step of coupling a second end of the flexible hose to a mechanical metering system on a planter.

Other principal features and advantages of the invention will become apparent to those skilled in the art upon review of the following drawings, the detailed description and the appended claims.

BRIEF DESCRIPTION OF THE DRAWINGS

FIG. 1 illustrates a cart in accordance with the present invention;

FIG. 2 illustrates a side view of the FIG. 1 cart;

FIG. 3 illustrates a detail view of the FIG. 1 cart;

FIG. 4 illustrates a cross-sectional view of the FIG. 1 cart taken at Section 4—4 in FIG. 3;

FIG. 5 illustrates a detail view of the FIG. 1 cart showing a portion of the FIG. 1 cart undercarriage;

FIG. 6 illustrates a cross-sectional view of the housing of the FIG. 1 cart taken at Section 6—6 in FIG. 8;

FIG. 7 illustrates a side detail view of the cart of FIG. 1 showing an alternate drive system for the metering cylinders;

FIG. 8 illustrates a vertical cross-section of the housing and tube taken at Section 8—8 in FIG. 6;

FIG. 9 illustrates an alternative pneumatic insert for the housing;

FIG. 10 illustrates a cross-sectional view of the housing in tube with the insert of FIG. 9 installed;

FIG. 11 illustrates a cross-sectional view of the insert of FIG. 9 taken at Section 11—11 in FIG. 10;

FIG. 12 illustrates a schematic representation of a Cyclo unit;

FIG. 13 illustrates a cross-sectional view of the Cyclo unit of FIG. 12 taken at Section 13—13 in FIG. 12;

FIG. 14 illustrates a cross-sectional view of the seed tube of FIG. 13 taken at Section 14—14; and FIG. 15 illustrates a cross-sectional view of the seed tube of FIG. 13 taken at Section 15—15.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, a particulate feeder 10 (or "cart" as it is commonly referred to) is disclosed supported by a main frame 12, with a plurality of ground engaging wheels 14 rotatably mounted on frame 12 to movably support the main frame 12 and particulate feeder 10 on the ground. Each wheel 14 is suitably supported on an axle 16 via suitable bearing means (not shown). Axles 16 are mounted on laterally extending members 18 and 20 of main frame 12 and aligned so that the wheels 14 track substantially parallel paths in operation. Laterally extending member 18 comprises a portion of main frame 12 proximate to a forward end 22 of particulate feeder 10 and laterally extending member 20 comprises a portion of main frame 12 proximate to a rearward end 24 of particulate feeder 10. In this description, "forward" and "rearward" are used to describe the relative components as viewed from right to left as in FIGS. 1 and 2. It is understood that particulate feeder 10 could be operably hitched behind a tractor at either its forward or rearward ends so that the use of these directional terms in this description is merely for discussion purposes.

A rigid elongated tube 26 extends longitudinally as the primary longitudinal portion of the main frame 12. Tube 26 extends from forward end 22 to rearward end 24 of particulate feeder 10 with the laterally extending members 18 and 20 fixedly mounted perpendicularly thereto.

Figure 2:
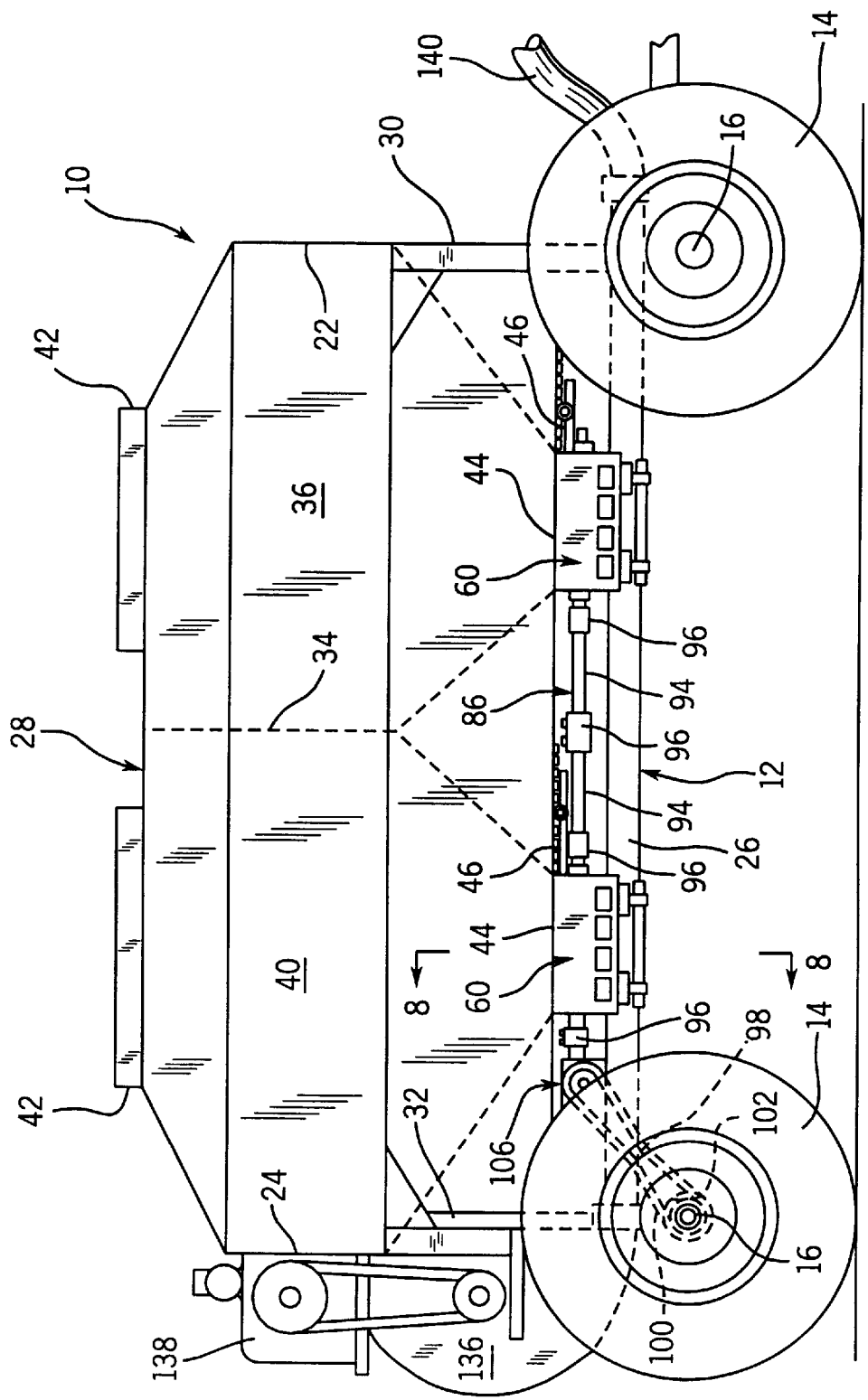

As shown in FIG. 2, particulate container bin 28 is supported on main frame 12 by forward and rearward support buttresses 30 and 32. Forward support buttress 30 is fixedly secured to the forward end of tube 26 and rearward support buttress 32 is fixedly secured to laterally extending member 20. Particulate container bin 28 can be divided into a plurality of hoppers by positioning a divider means such as a divider wall 34 within container bin 28. Bin 28 is thus divided in this embodiment into a forward hopper 36 an rearward hopper 40. Each hopper is generally rectangular with an access door 42 at its upper end and sloped walls forming its lower end to form a rectangular funnel arrangement leading to a particulate discharge outlet 44.

As shown in FIGS. 2–4, a sliding door 46 is mounted adjacent discharge outlet 44 to selectively open and close outlet 44 to the passage of particulate matter. Each sliding door 46 is provided with means for moving the sliding door relative to the particulate outlet 44 so that the position of door 46 is selectively variable from a first open position to a second closed position to control the size of the particulate outlet 44. Preferably, the moving means comprises a rack-and-pinion arrangement where rack 50 is mounted on bin 28 and a pinion 52 is rotatably mounted in a sleeve 54 secured to each door 46. The teeth of pinion 52 are aligned with the teeth of rack 50 so that rotation of the pinion 52 on its shaft moves the door 46 relative to outlet 44. A crank 56 may be attached to pinion 52 to rotate the pinion. Door 46 is dimensioned to seal outlet 44 when in its closed position to prevent particulate matter from passing through outlet 44.

Figure 6:
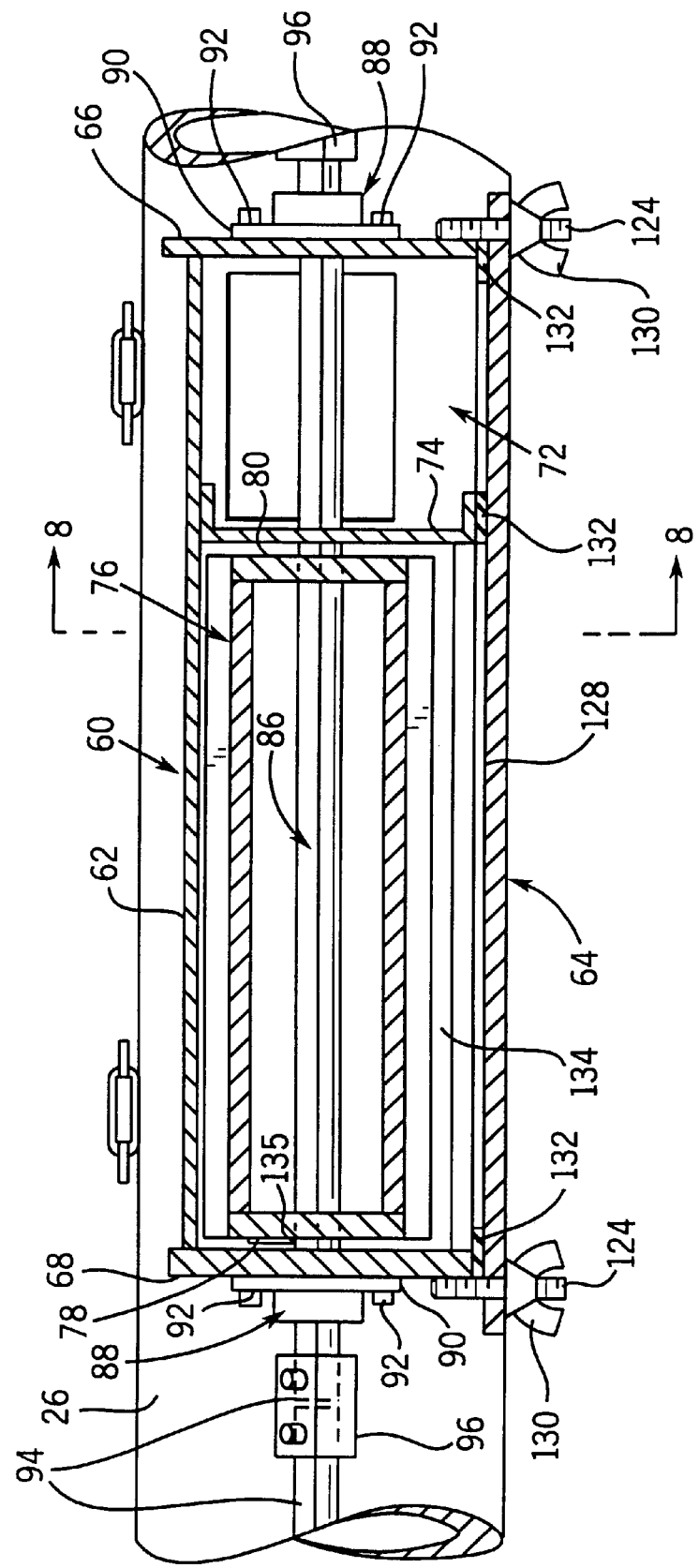

A housing 60 extends from outlet 44 of each hopper to elongated tube 26. The housing is generally rectangular in horizontal cross-section and corresponds to the rectangular opening defined by outlet 44. As shown in FIGS. 3, 4 and 6, housing 60 has longitudinal side walls 62 and 64 and transverse end walls 66 and 68. The enclosure formed by housing 60 is subdivided into first and second chambers 70 and 72, respectively, by a generally vertical wall 74. Forward hopper 36 and rearward hopper 40 each has its own housing 60.

Figure 5:
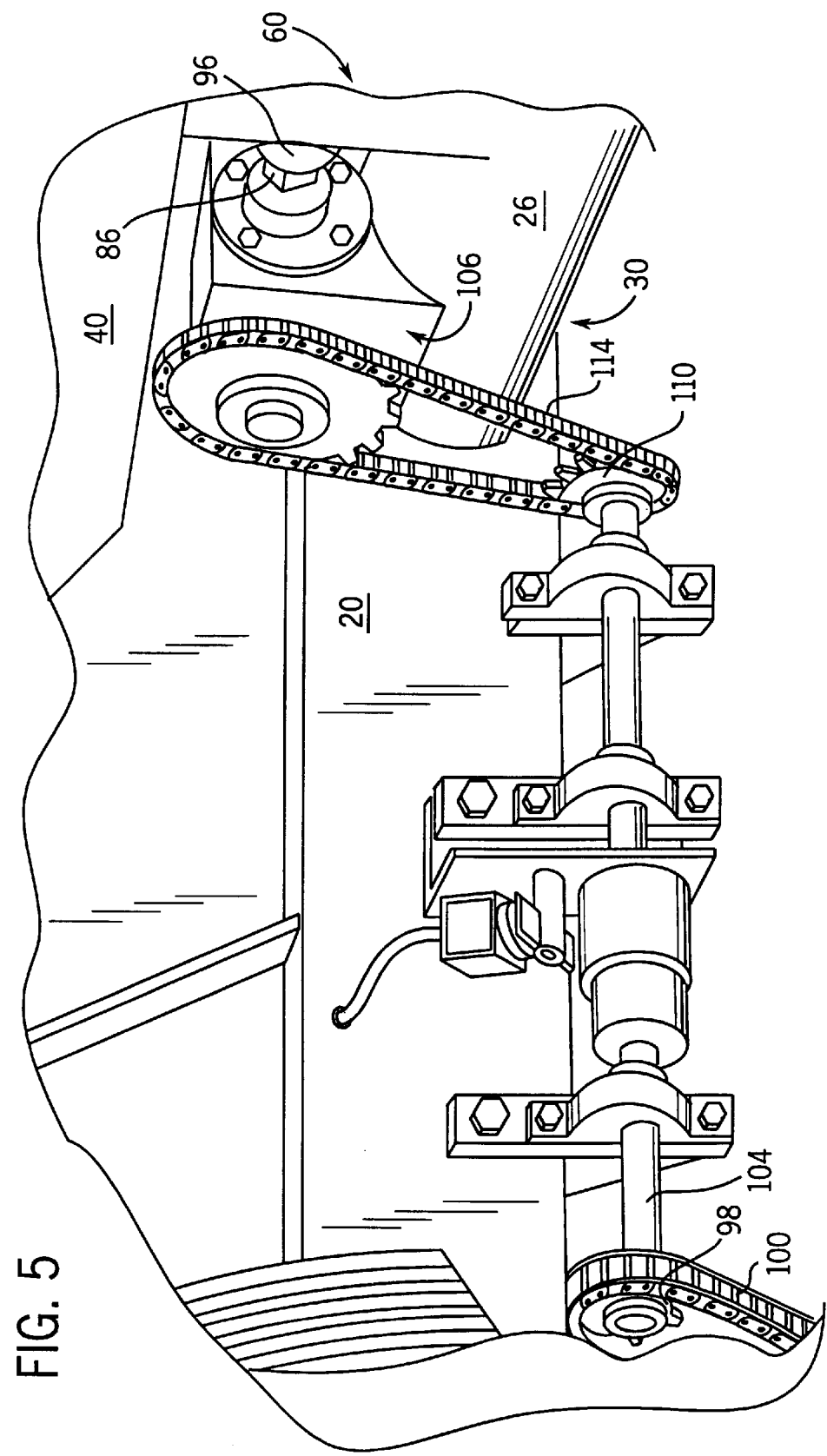
Figure 7:
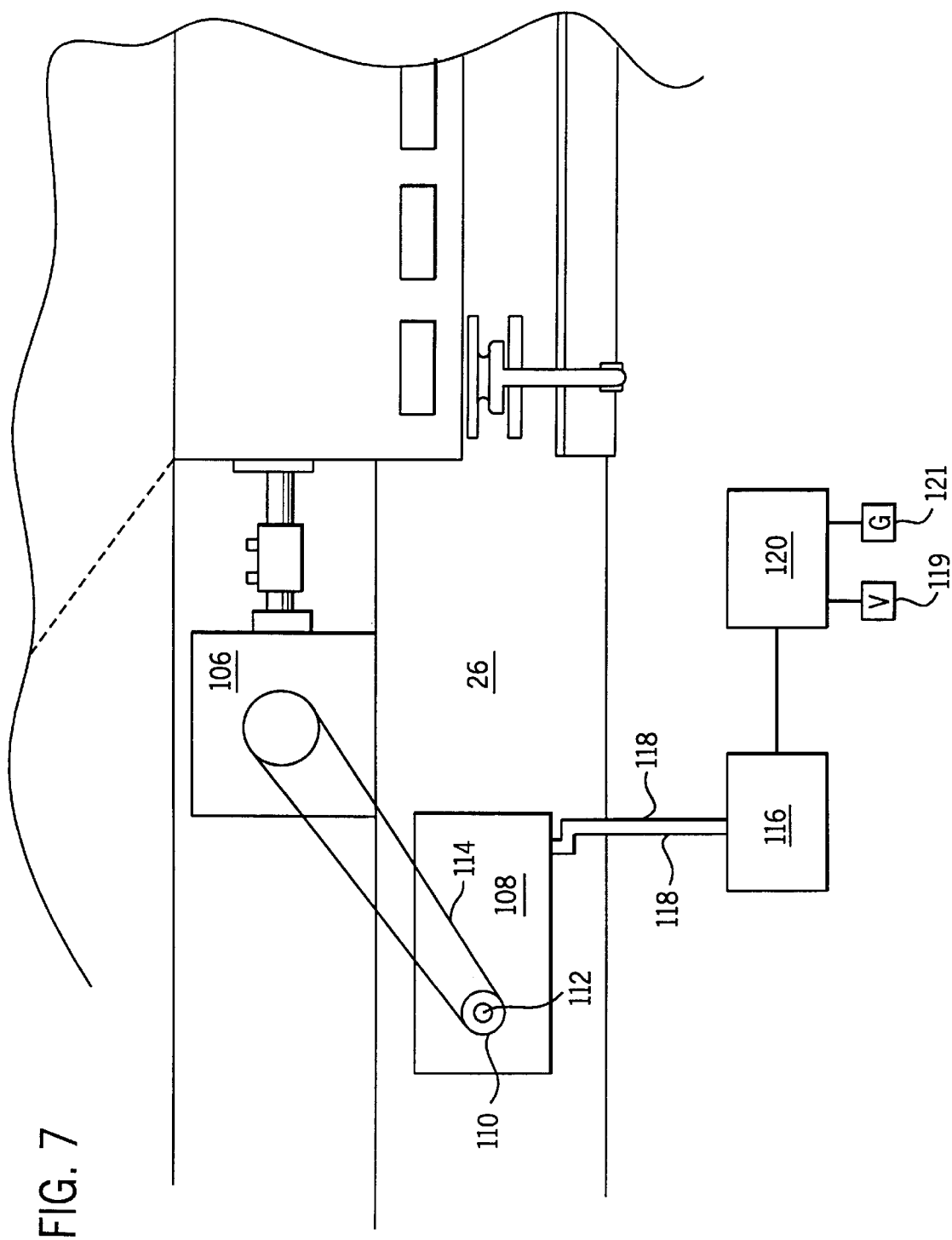
Figure 9:
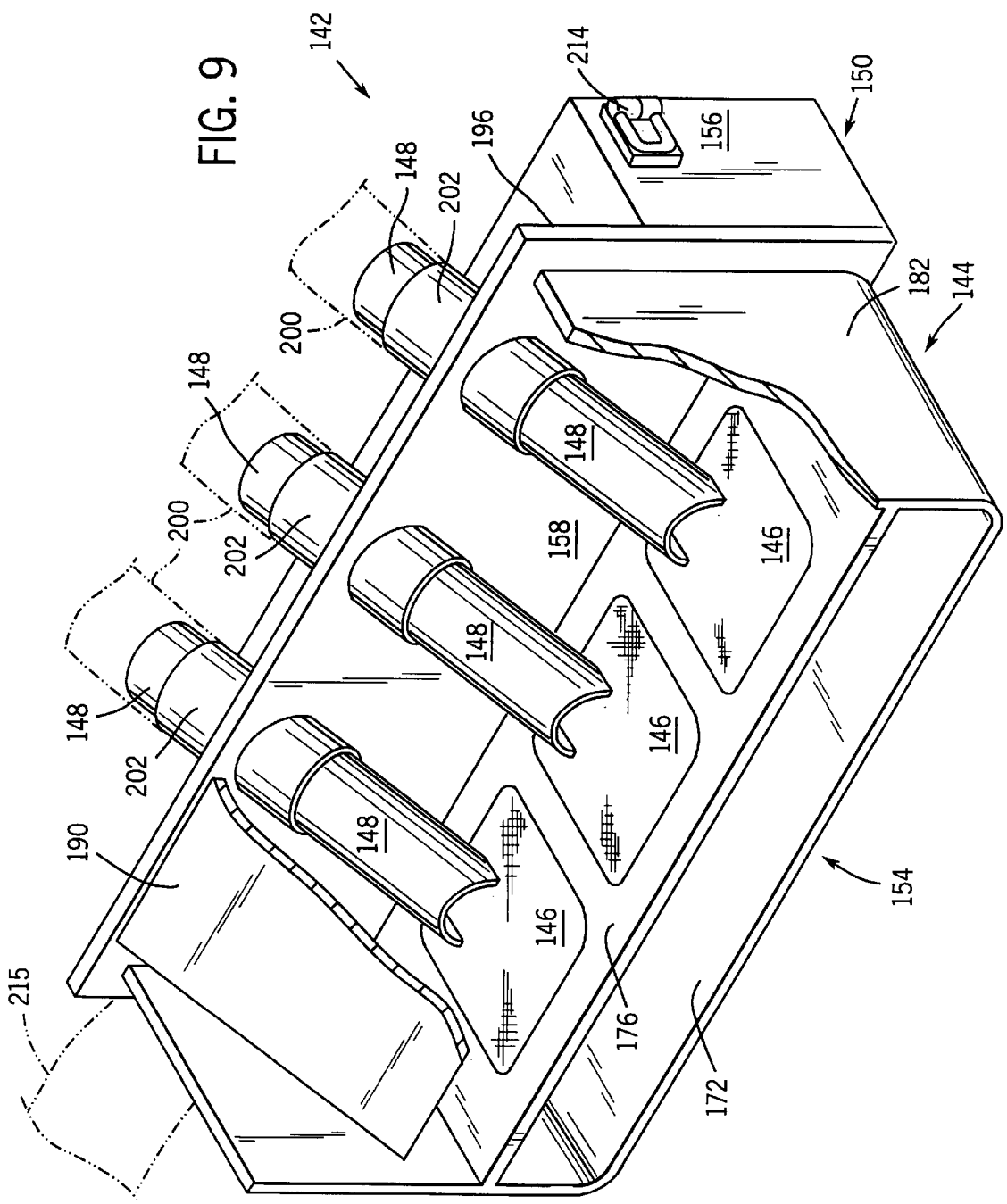

Each housing can be alternately fitted with two structures for delivering particulate matter. The first of these, a particulate metering cylinder, is described in detail in the Gust reference. This metering cylinder is shown in FIGS. 3 and 6 of the present application. The other structure is a plenum for the pneumatic delivery of seed preferably to one or more mechanical metering devices located on the planter or tool bar. This structure will be discussed below in regard to FIGS. 9–11. Metering cylinder 76 is rotatably mounted on a longitudinal axis in the first chamber 70 in housing 60. Cylinder 76 has a first end 78 and a second end 80 defining its longitudinal axis of rotation. A plurality of ribs 82 extend from the first end to the second end on its outer cylindrical surface to define a plurality of troughs 84 on the outer side of cylinder 76 therebetween. A drive shaft 86 is rotatably supported by bearing collars 88 adjacent to each end of housing 60. Each bearing collar 88 is secured to its respective end wall 66, 68 of housing 60 by a bearing mount plate 90 and fasteners 92. Drive shaft 86 passes through the metering cylinder 76 from its first end 78 to its second end 80 and passes completely through housing 60 longitudinally (both chambers 70 and 72) as shown in FIG. 6. Preferably, the drive shaft is comprised of a plurality of drive shaft sections 94. Shaft sections 94 are secured end-to-end along a single axis of rotation, as best shown in FIGS. 2 and 6, by suitable fastening means, such as a plurality of connecting collars 96. In this manner, a metering cylinder can be removed or replaced from either housing 60 without requiring the removal of the entire drive shaft 86 from both housings. The metering cylinder 76 is slidably mounted on drive shaft 86 to rotate with drive shaft 86 when it is rotated. In one embodiment, the drive shaft is driven by one of the wheels of the particulate feeder to thereby deliver a predetermined amount of particulate to a specific area of soil regardless of the velocity of the particulate feeder. As shown in FIGS. 2 and 5, a drive gear 98 engages a chain 100 which engages a sprocket 102 axially secured to one of the wheels 14. Drive gear 98 is, in turn coupled to drive rod 104 which is coupled to a right-angle gear box 106, which in turn is coupled to drive shaft 86. Thus, the rotation of drive shaft 86 is proportional to the rotation of wheel 14. Alternatively, a hydraulic motor or electric can be used in place of the gear train of FIGS. 2 and 5, as shown schematically in FIG. 7. In this alternative embodiment, a hydraulic or electric motor 108 is fixedly mounted to elongate tube 26. A sprocket 110 is coupled to motor shaft 112 which in turn is coupled through an endless chain 114 to a gear box 106. A proportional control valve or electric controller 116 is coupled to motor 108 by hydraulic tubing or electrical wire 118 to regulate the flow of hydraulic fluid or voltage to motor 108. An electronic controller 120 is electrically coupled to proportional valve 116 or electric controller to determine the degree of valve opening or voltage output, and thus the rotational speed of motor 108 and drive shaft 86. This controller may be coupled to other devices, such as a velocity sensor 119 to sense the speed of the vehicle over the ground, or to navigational devices such as a GPS navigation system 121. In this manner, the rate of application of particulate matter may be regulated depending not only on the rotation of the vehicle's tires, but on its actual position or speed in the field.

Figure 8:
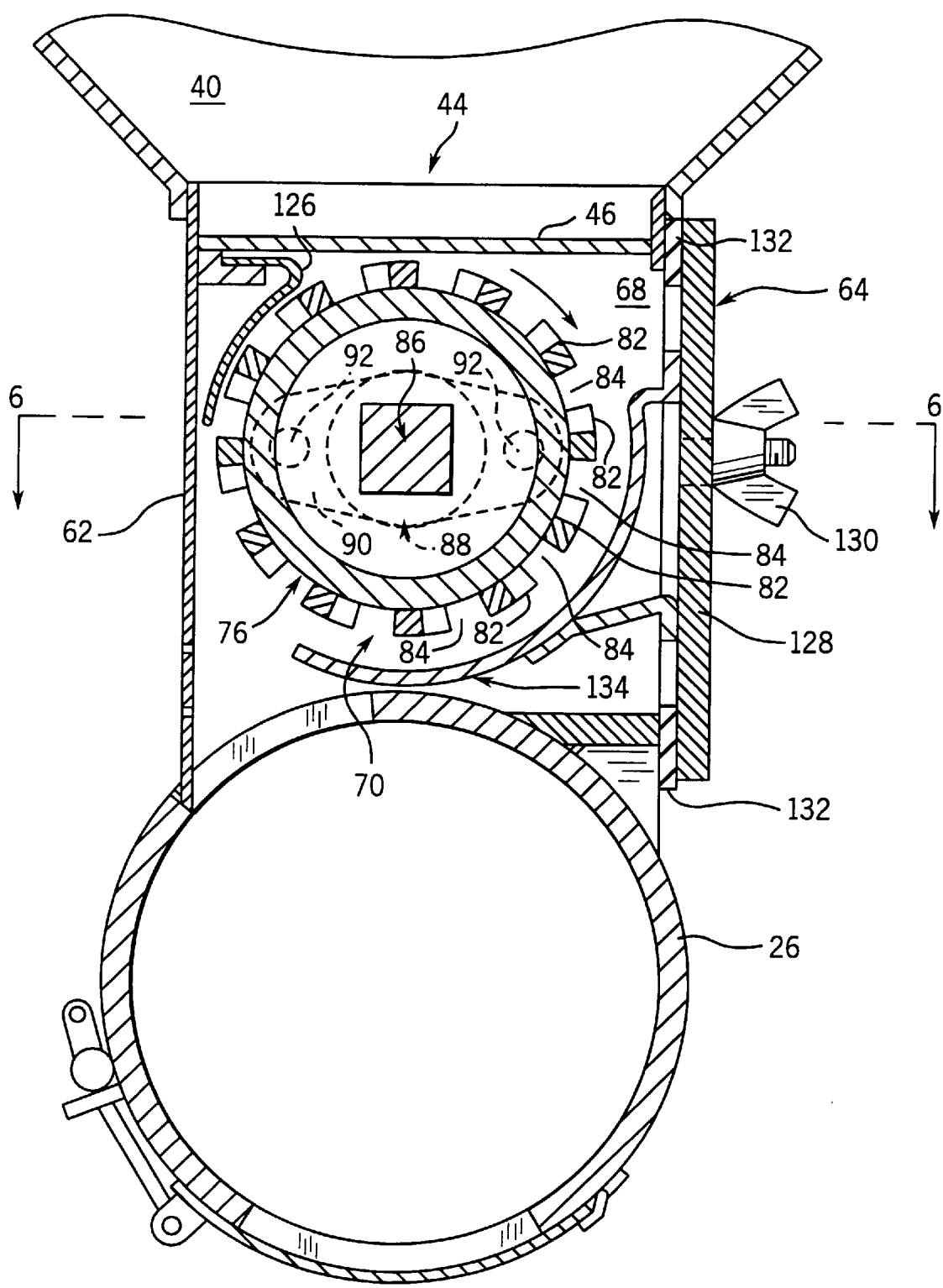

FIG. 8 shows the configuration in lateral cross-section) of the first chamber 70 of housing 60. Metering cylinder 76 is mounted under sliding door 46 and rotates on drive shaft 86 in a clockwise direction when drive shaft 86 is driven. A particulate shield 126 is mounted adjacent to an upper edge of longitudinal side wall 62 of housing 60 and extends the full longitudinal length of the first chamber 70. Particulate shield 126 covers a limited arcuate range of the outer side of metering cylinder 76 sufficient to prevent particulate flow between cylinder 76 and shield 126 when cylinder 76 is rotating in use. Shield 126 prevents particulate matter from flowing downwardly between against the rotation of cylinder 76 and guides particulate matter into the troughs 84 of cylinder 76.

Side wall 64 of housing 60 has a panel 128 that extends the entire longitudinal distance of side wall 64. Panel 128 is removably connected to side wall 64, preferably with a quick release means such as wing nuts 130 or latches. Seal 132 is preferably provided between the side wall and the panel to prevent the leakage of particulate matter, and to maintain the air pressure within the elongated tube 26 coupled to the bottom of housing 60. Preferred materials include a cork, plastic or rubber gasket, slightly flexible to conform with the mating surfaces of side wall 64 and panel 128.

A curved particulate guide 134 is fixed to he inner facing surface of panel 128. Guide 134 prevents particulate matter from pouring freely from outlet 44, past cylinder 76 and into the bottom of housing 60. By fitting in close proximity to cylinder 76, it regulates the amount of particulate swept by the rotating cylinder into the bottom of housing 60.

In addition to working in conjunction with the guide to regulate flow through the system, the removable panel also provides access to cylinder 76 for maintenance, adjustment or replacement.

In operation, seed enters troughs 84 under the force of gravity. As the mechanical, hydraulic or electric drive systems described above rotate the metering cylinder the troughs are rotated past guide 134 until the end of guide 134 is reached. At this point, the seed falls through an upper opening in tube 26. Tube 26 is not just a structural member, but is a part of the seed distribution system itself. Referring to FIG. 2, a fan 136 driven by engine 138 forces air into tube 26. This air flows through the length of tube 26 until it exits in flexible hose 140 coupled to the end of tube 26 remote from the fan and motor. As seed is metered by cylinder 76 into tube 26, this air flow is large enough to carry the particulate matter with it as it travels the length of tube 26, and upward, out of the system through flexible hose 140. As mentioned above, tube 26 may be divided by a partition into two separate air paths. In such an arrangement the hoppers would empty into separate air paths, and two separate flexible hoses would lead back to the tool bar, one from each of the air paths.

The above described metering cylinder is capable of metering relatively large flow rates (on the order of 300 pounds per minute at a fairly constant flow rate. This works well for such materials as fertilizer, herbicides, and seeds that are planted at a relatively high rate (greater than 60 pounds per acre). It is not as effective for seed such as canola, corn or sunflowers which must be metered out at a rate of around 4–25 pounds per acre.

A pneumatic delivery system 142 which may be substituted for the removable panel and metering cylinder of the device described above is shown in FIGS. 9–11. Referring to FIG. 9, pneumatic delivery system 142 is comprised generally of a plenum 144 covered with one or more gas-permeable membranes 146, with one or more open-ended seed distribution tubes 148 disposed above the membranes. Air blown up through the plenum travels through the membrane and around the base of the open-ended tubes. This air escapes upward through the open-ended tubes carrying with it any grain which has spilled between the open ends of the tubes and the membrane. A portion of plenum 144 and membranes 146 are inserted into either one or both of the housings 60 in place of removable panel 128 and cylinder 76 so that seed or other particulate matter in the hopper will fall through outlet 44, onto the membranes and between the end of the distribution tubes and the membrane.

Referring to FIGS. 9 and 10, plenum 144 is in the form of a substantially square chamber 150 extending the length of opening 152 that panel 128 normally covers when the metering cylinder is employed to meter particulate matter, and an air conduit 154 in fluid communication with square chamber 150 that extends into the housing.

Square chamber 150 is formed of a vertical end wall 156 that is joined to an inner vertical side wall 158 and an outer vertical side wall 160. A second vertical end wall 162 is provided to which tube 164 is coupled. Tube 164 is typically connected to an external air supply via a flexible hose 215. In this manner air may be forced through flexible hose 215 through tube 164 and into the plenum. Inner vertical side wall 158 of chamber 150 has three openings 166 to direct air from square chamber 150 into air conduit 154.

Referring to FIGS. 9 and 11, air conduit 154 is rectangular in vertical cross-section, with one end fluidly coupled to square chamber 150 and a second end abutting and substantially sealed by side wall 62 of housing 60. Referring to FIG. 10, the lower surface 172 of air conduit 154 seals off air flow into or from tube 26, by sealing off opening 174 in tube 26. The upper surface 176 of conduit 154 has openings 178 that fluidly couple air conduit 154 to the upper portion of housing 60. openings 178 are covered with a semipermeable membrane 146, such as a screen, a mesh, a grid, a plurality of closely spaced or woven rods, or the like, that will block the flow of particulate matter downward into conduit 154, while permitting the flow of air upward from air conduit 154 through membrane 146 and out through tubes 148.

Referring to FIGS. 9 and 11, air conduit 154 also includes a first end wall 182 and a second end wall 184. These walls are coupled to upper conduit surface 176 and lower conduit surface 172, and to inner vertical side wall 158 of square chamber 150 to define the air conduit. In addition, first end wall 182 has an upper portion 186, and second end wall 184 has an upper portion 188 that seal off the openings in end walls 66 and 68 of housing 60. The openings are created when shaft 86 is removed, along with cylinder 76 to make room for air conduit 154 of plenum 144 to be inserted into the housing through opening 152. By sealing off these openings only a limited amount of air can escape from the housing.

Coupled to and disposed between upper portion 186 of first end wall 182 and upper portion 188 of second end wall 184 is seed deflection plate 190. This plate extends at an angle of about 40 degrees of horizontal from the upper portion of inner vertical wall 158 of square chamber 150 into the housing. Plate 190 is adjustably coupled to upper portions 186 and 188 to allow the user to vary gap 192 between edge 194 of plate 190 and side wall 62 of the housing. Since plate 190 is disposed above membrane 146, between membrane 146 and the hopper, it controls the flow of particulate matter onto membrane 146. Gap 192 preferably has a width of between 1 and 3 inches, depending on the type of seed and seed flow rate.

A flange 196 is provided between square chamber 150 and air conduit 154 to engage the outer periphery of opening 152 in the housing. A flexible seal 198 is preferably disposed between flange 196 and the periphery of opening 152 to prevent air and particulate matter from escaping from the housing through opening 152.

The upper portion of vertical side wall 158 has three additional openings, each defined by circular pipes 202, and each of which slidingly supports a seed distribution tube 148. The outside diameter of each of seed distribution tubes 148 is preferably only slightly smaller than the inside diameter of pipes 202 in which they are mounted. Each of pipes 202 preferably has a set screw 204 or other clamping device for fixing its respective seed distribution tube in a plurality of positions. In this manner, each of the distribution tubes' position with respect to the housing and membrane can be separately adjusted.

Each seed distribution tube 148 has a first end extending through vertical side wall 158 and terminates adjacent to membrane 146. The distance between the bottom edge of the tubes and the top of membrane 146 is preferably adjustable over a range of between 0 and 2 inches. Seed distribution tubes 148 are oriented at an angle of about 40 degrees of horizontal, and preferably at about the same angle as seed deflection plate 190. The lower end 206 of the seed distribution tubes is cut away such that the open end has a first edge 208 that defines a plane substantially parallel to membrane 146. Since, in the preferred embodiment, each tube's angle is about 40 degrees from horizontal, and since the membrane is substantially horizontal, the angle of edge 208 is about 40 degrees with respect to the longitudinal axis of tube 148. The effect is to provide a relatively constant opening between the membrane and the open end of the seed distribution tube along this edge. A second edge 210 is provided at the end of the seed distribution tube that defines a plane substantially perpendicular to the longitudinal axis of the seed distribution tube. This edge provides an increased gap between the end of the distribution tube and the membrane in the form of an arched opening 212 best seen in FIG. 11. By providing a larger gap at the edge of the seed distribution tube closest to the source of particulate matter (i.e. the gap between seed deflection plate 190 and side wall 62 of the housing), the particulate matter can more easily spill into the gap and be carried upward.

In use, the air conduit of the plenum is inserted horizontally into opening 152 of housing 60 until upper and lower surfaces 176 and 172 are proximate to side wall 62 of housing 60. At this point seal 198 is also proximate to opening 152 in side wall 64 of housing 60. A quick release mechanism, here shown as latches 214 (FIG. 9), are then engaged to compress seal 198 between flange 196 and the periphery of opening 152. An air supply hose 215 is coupled to tube 164 to provide a source of air under pressure to the plenum. The other end of this hose is preferably coupled to fan 136. A flexible hose is coupled to each distribution tube and leads to the planter or tool bar.

When air is forced into the plenum through tube 164, it travels upward through membrane 146 into the hopper. Once the hopper is pressurized, the only escape for air is up the distribution tubes 148. Typically the air supply maintains a positive pressure of between 12 and 22 ounces per square inch in the hopper.

Once door 46 is opened, grain falls down on top of seed deflection plate 190 and then into gap 192 between seed deflection plate 190 and side wall 62 of housing 60. After it passes through gap 192, it pours onto membrane 146, increasing in depth until a portion of the expanding pile of grain spills into the space between the end of seed distribution tube 148 and membrane 146. Since air is permitted to escape up the seed distribution tubes, and does escape at considerable velocity, the air flow has the velocity necessary to levitate the grain up the distribution tube, down the flexible hoses attached to the tubes, and into the planter tool bar attached to the remote end of the flexible hoses.

In some cases, each seed distribution tube will feed a different number of metering devices on an implement, and thus will have to supply different amounts of grain. For this reason, each of the seed distribution tubes can be separately adjusted to vary the gap between that tube and its associated membrane. By widening the gap, the distance between the bottom end of distribution tube 148 and the grain increases, making it more difficult to levitate the grain, which decreases the amount of grain delivered with the same amount of air flow.

In a preferred installation, the hopper illustrated in FIG. 1 would be coupled to a planter or tool bar and a tractor. In one of the housings, the cylinder 76 would be replaced with pneumatic delivery system 142 to distribute seed contained in one bin of the hopper. Each seed distribution tube exiting that plenum would be coupled to a mechanical metering system on the planter, preferably one or more Cyclo units. The other housing would support cylinder 76, which would meter fertilizer from the other bin into tube 26. Tube 26, in turn would be coupled to air distribution manifolds on the planter or tool bar for distributing fertilizer to each row that is planted. Thus, two distinct distribution systems having substantially different capacities to separately feed both seed and fertilizer are provided in a single vehicle.

Pneumatic delivery system 142 in conjunction with its associated hopper and housing provides a seed delivery system whose seed output can be quite effectively and automatically regulated by controlling the amount of air that is allowed to flow up the distribution tubes.

FIG. 12 illustrates a mechanical metering system, in this embodiment, a Cyclo unit that meters seed to a plurality of ground openers or other seed insertion devices. The Cyclo unit generally comprises a cylindrical drum 216 that rotates about a substantially horizontal axis. The drum is supported by, and is rotationally sealed against a base plate 218.

The drum has a plurality of indentations 220, each having a hole 224 at its base through which air may escape from the drum to the atmosphere. A fan (not shown) supplies air into the interior of the Cyclo drum, and maintains it at a pressure preferably about 5 to 15 ounces per square inch above atmospheric pressure. Air escapes to the atmosphere from the drum through each of the holes 224 in the drum indentations.

Grain is maintained at a relatively constant level in the base of the Cyclo drum, tumbling in the bottom of the drum as the drum rotates. As the seed tumbles, and assuming it is maintained at the proper depth in the drum, a single seed will fall into each and every indentation. Due to the flow of air out holes 224 at the bottom of the indentation, each seed will become trapped there. As the drum continues to rotate, each of these seeds will be lifted to the uppermost point in the drum, where upon it will begin to descend.

To release each row of seeds from their respective indentations, a row of flexible polymeric wheels 226, are disposed on an axle 228 and are pressed against the outside of the drum. As the drum rotates, these wheels roll across the outer surface of the drum. During this rotation, the wheels will periodically cover and seal off a row of holes 224. The effect is to simultaneously release an entire row of seed.

As each row is released, each seed falls into a manifold 230 comprised of 8 individual passageways. Each of the passageways comprising the manifold are coupled to flexible tubes (not shown), which lead to a ground opener attached to the planter or tool bar. The manifold is fixed to the base plate, which holds a free end 232 of the manifold in close proximity to the rotating drum.

Referring to FIGS. 13 and 14, seed is delivered to the Cyclo unit through flexible hose 200 which is coupled to seed delivery tube 234. Seed delivery tube 234 is directed downward toward the bottom of Cyclo drum 216 at an angle of between 15 and 35 degrees. Seed tube 234 is preferably rectangular in axial cross-section, measuring between 1 and 4 inches square, and more preferably between 1.75 and 2.75 inches square. It has a top surface 236, a bottom surface 238 and two vertical side walls 240. About 5 inches of the seed tube extends into the Cyclo drum, terminating in an open end 242 the edge of which defines a horizontal plane parallel to, and equidistantly spaced from, the bottom of the Cyclo drum. The gap between open end 242 and the bottom of the Cyclo drum is preferably between 0.5 and 1.0 inches, a wider gap being suitable for operation in adverse conditions, such as side hills.

Referring to FIGS. 13 and 15, a gas-permeable membrane 244, preferably in the form of a screen, mesh, or grid, defines the top surface and upper half of each side wall for the lower 4 to 5 inches of tube 234. This screen preferably extends to open end 242.

When the system is initially started up, fan 136 blows air into the plenum, up through membrane 146 and distribution tube 148, through flexible hose 200 coupling the distribution tube to seed tube 234 and out open end 242 into Cyclo drum. If the interior of seed tube 234 had a constant open cross-sectional area over its entire length, the individual seeds would arrive at open end 242 with considerable velocity, which would propel them completely out of open end 242 and into Cyclo drum 216. The Cyclo drum would be substantially filled at a high rate which might result in overfilling. To reduce seed exit velocity during start up, a baffle 246 is provided inside seed tube 234 to block off between 20% and 50% of the cross-sectional area of the seed tube. This baffle is preferably disposed upstream of membrane 244. Baffle 246 is preferably disposed across the bottom surface 238 of seed tube 234 thereby providing a gap between the top surface 236 of seed tube 234 and the top of baffle 246 for air and seed to escape. Air with entrained seed enters the seed tube on start-up with a considerable velocity. However, since seed tube 234 is preferably straight, the seed will fall downward under the force of gravity as it travels down the seed tube approaching the baffle. This effectively separates the seed from the air propelling it and may be considered to divide the seed tube into two different flow areas: an upper region containing primarily air, and a lower region containing primarily seed. For this reason, the seed, traveling in the lower portion of the seed tube impinges upon baffle 246 while the air proceeds, relatively unimpeded, through the gap defined between the top of baffle 246 and top surface 236 of the seed tube. As the seeds impinge upon baffle 246, they bounce off the baffle, reversing their direction of travel and go back upstream, whereupon they collide with seeds traveling downstream to collectively create a turbulent, relatively low-velocity, seed-filled region just upstream of baffle 246. As might be expected with this turbulent activity, all the seeds will eventually get blown over the top of baffle 246 and will continue down seed tube 234 at a considerably reduced velocity. This reduction in overall velocity insures that the start-up seed flow is not prematurely ejected from the end of seed tube 234 into the Cyclo drum, but gradually fills the lower end of the seed tube at a lower overall velocity.

Air escapes from seed tube 234 predominately through membrane 244, and not through open end 242 of seed tube 234 during a normal operation. Since this air flow carries the grain up the flexible tube coupling distribution tube 148 and seed tube 234, seed flow may be reduced by restricting air flow. Air flow, and thus the seed puddle in the bottom of the Cyclo drum is controlled in the following manner. When seed is carried down the seed tube, it rests on the bottom of Cyclo drum 216. If the turning Cyclo drum does not remove seed faster than it arrives from the distribution tube, the seed begins to fill the lower screened-in portion of the seed tube. As the lower screened-in portion is filled, membrane 244 is increasingly blocked, gradually preventing the free flow of air out through membrane 244. As this air flow is gradually reduced, the flow of seed is also gradually reduced, since the velocity of air up through the distribution tube (and hence its ability to lift seed) is reduced. Eventually, the air flow is reduced to the point that grain arrives at the top of the seed tube at the same rate it is removed from the bottom. At this point, the system is in equilibrium, and the grain level in the seed tube neither raises or lowers. In this manner, the bin/plenum/distribution tube arrangement works together with the seed tube/grain meter arrangement to automatically control the flow and level of seed.

While the seed tube described above is most advantageous when employed with a Cyclo drum, it may also be used with a variety of other grain metering devices in which a seed puddle is maintained.

While the distribution tube/seed tube combination will regulate the flow of seed, there are additional enhancements to the combination that reduce the risk of "slugging," in which portions of the flexible hose coupling the distribution tube and seed tube are plugged. As long as the air velocity through the system is high, the levitated grain will travel rapidly from the bin to the Cyclo unit. The air velocity is not constant, however, but varies according to the level of grain in seed tube 234 in the Cyclo unit, as discussed above. At various times, such as when the tractor/cart/planter stops, no seed is planted, the Cyclo drum stops rotating, and the seed tube fills up until it cuts off substantially all air flow. As the air velocity is so reduced, the air eventually reaches a velocity at which it will no longer lift and move seed through the system. It is this effect that allows seed tube 234 to automatically control the amount of grain in the Cyclo unit. Regulating flow in this manner may cause problems, however. Flexible hose 200 is typically 10–40 feet long, and typically has several "dips" along its length. Unless the flexible hose and the delivery tube are sized correctly, seed may drop and slide down into these dips when air velocity is reduced. This is called "slugging". Once the seed gathers in these pockets in quantities large enough to create a plug, almost all air flow through the flexible hose will be cut off. To restore air flow, a farmer must stop his tractor and manipulate the flexible hose until these plugs of grain are removed.

Figure 10:
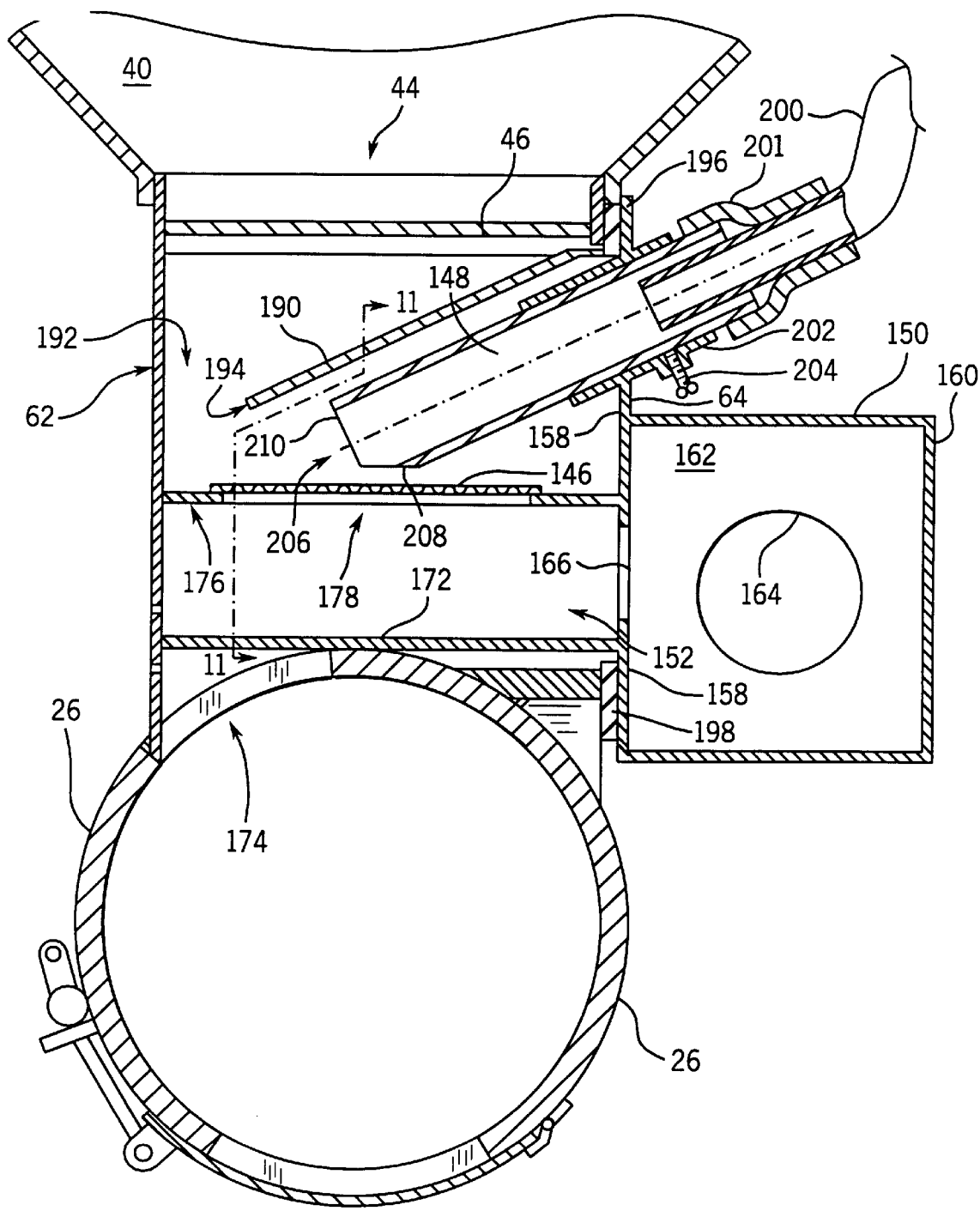
Figure 11:
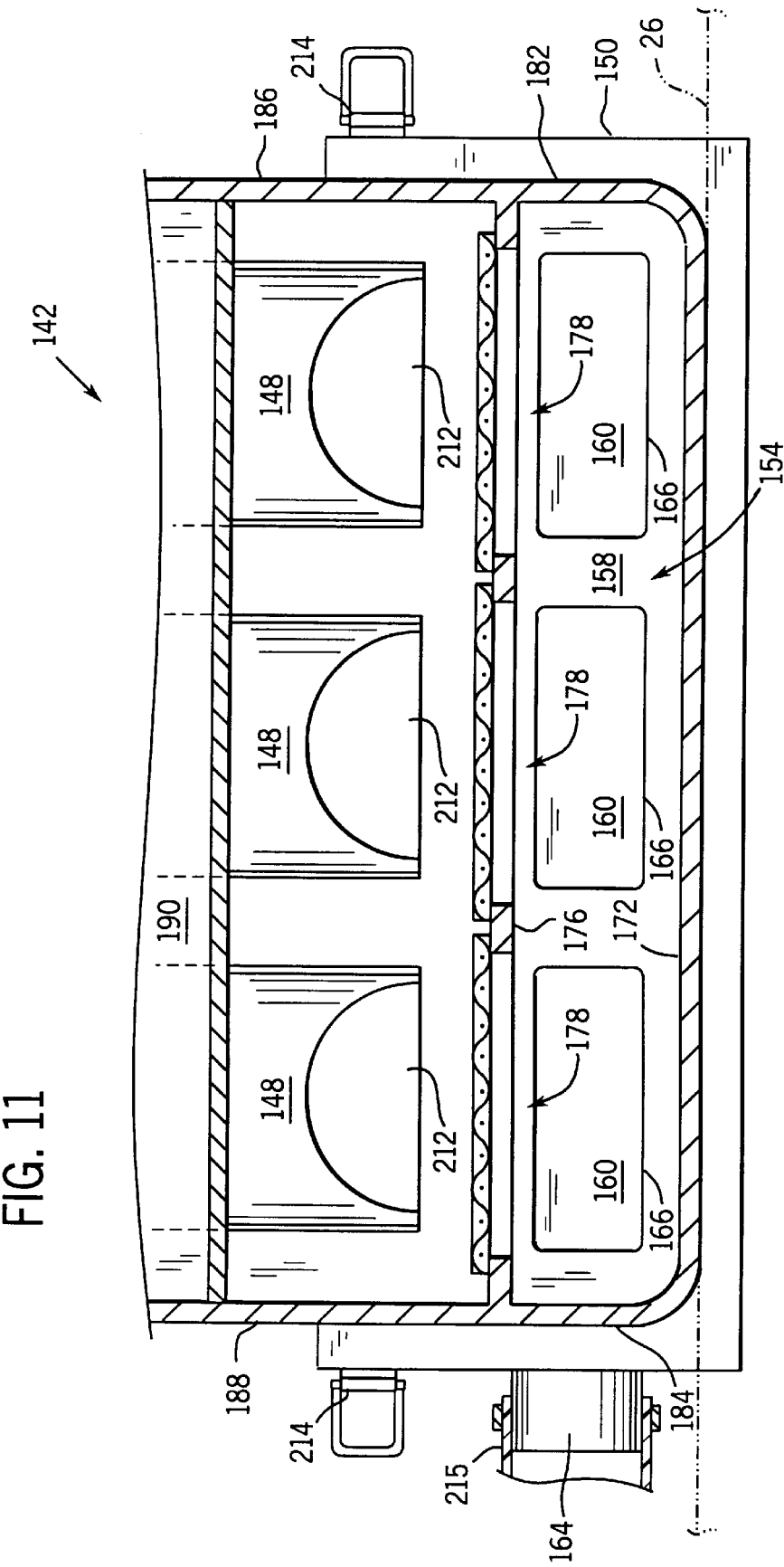
Figure 12:
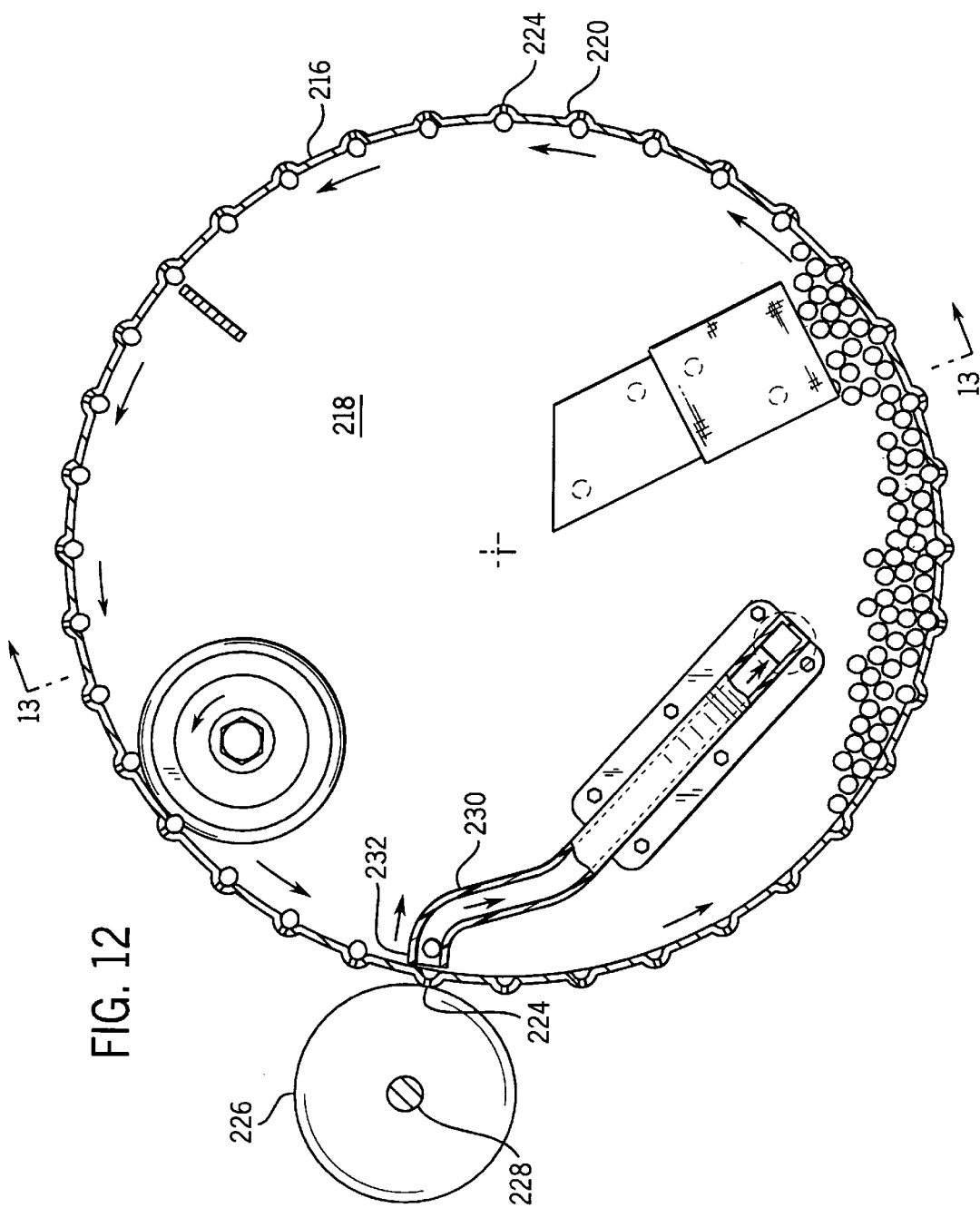
Figure 13:
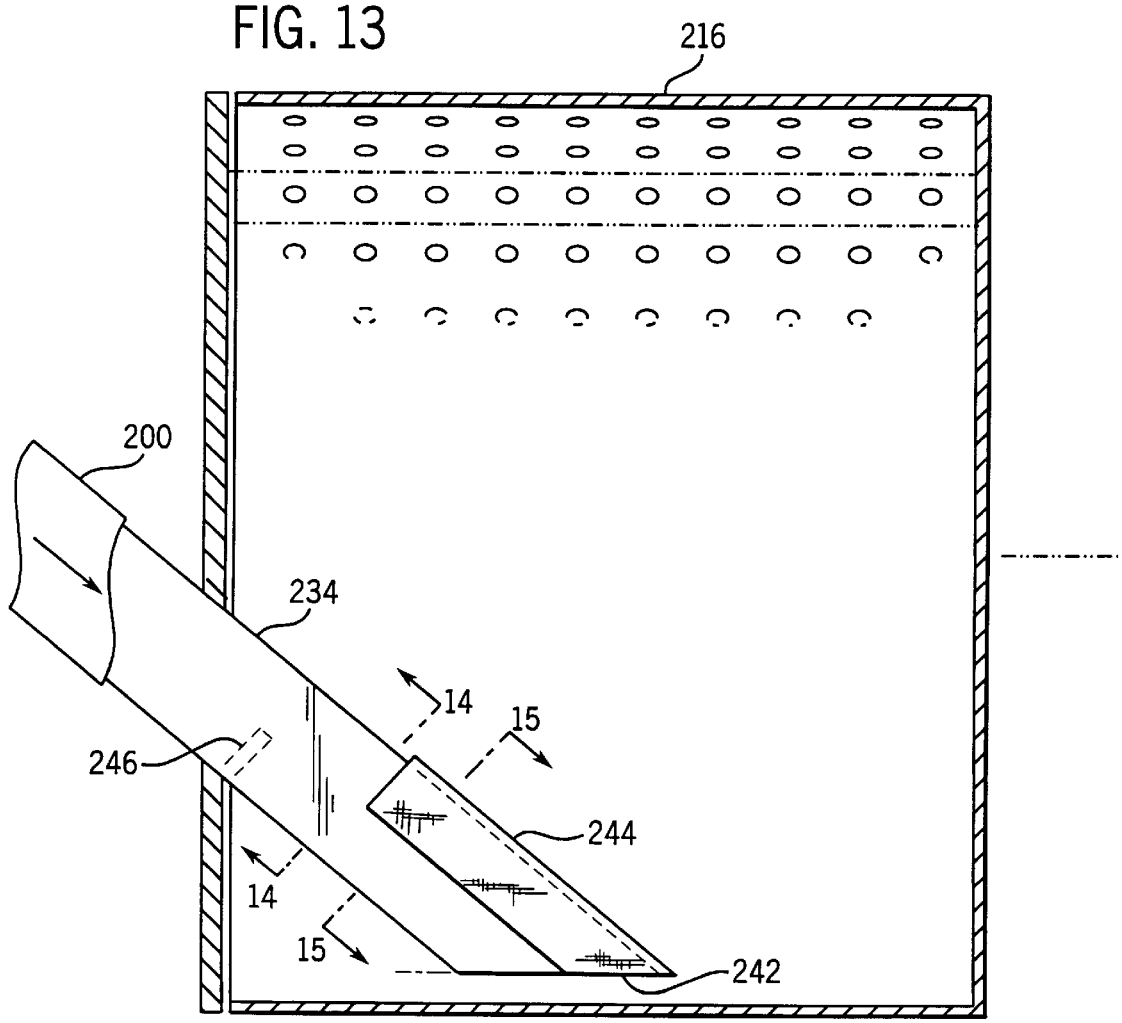
Figure 14:
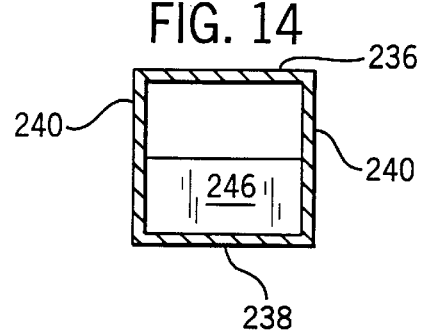
Figure 15:
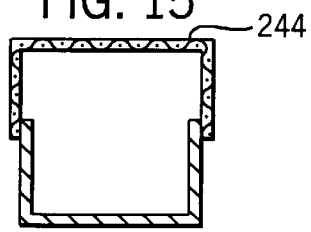

To prevent slugging, the cross-sectional area of the air flow path is reduced in the vicinity of the end of the distribution tube that picks up seed. In the embodiment illustrated here, this area reduction is provided by employing a flexible hose 200 with a smaller cross-sectional area than the cross-sectional area of distribution tube 148 at its lower end. As seen in FIG. 10, flexible hose 200 is inserted into the end of distribution tube 148 and is held in place by boot 201. The end of flexible hose 200 is preferably between 2 and 8 inches from the lower end of distribution tube 148.

Flexible hose 200 preferably has an inner diameter of 1.5 inches, and distribution tube 148 has an inner diameter of 1.88 inches. This provides a flow path with a larger cross-sectional area at the lower end of the distribution tube, that transitions into a smaller cross-sectional area farther along the flow path. This difference in cross-sectional area has the following effect. Since the same quantity of air flows through both the smaller flexible hose and the larger delivery tube, the average velocity in the flexible hose is larger than the average velocity in the delivery tube. Thus, whenever the air velocity through the system is reduced, the lowest velocity at any particular time will be the velocity in the delivery tube. Once the air velocity drops below a threshold velocity called "pickup" velocity in the distribution tube, seed will no longer be levitated in the distribution tube to start its journey to the Cyclo unit. Since the cross-sectional area of the flexible hose is significantly smaller than the cross-sectional area of the delivery tube, however, air velocity in the flexible hose will still be above the "pickup" velocity, and therefore any seed already in the tube will continue moving through the flexible hose to the Cyclo unit. The net effect is to purge the flexible hose whenever the velocity drops below the "pickup" velocity in the distribution tube thereby preventing slugging.

Experimentation has determined that the minimum area reduction should be at least 15% to provide this self-purging anti-slugging effect under most operating conditions.

There are effective limits to the area reduction, however. Clearly, the larger the area reduction, the larger the velocity difference and the greater the purging capacity of the system. If the area reduction is too great, however, the frictional losses in the flexible hose are great, requiring a significantly larger fan and motor than many particulate feeders are currently equipped with. In addition, as the area reduction increases, the velocity in the flexible tube becomes quite high, accelerating even durable seeds to a speed that will damage them when they arrive (and suddenly stop) in the Cyclo unit or other similar metering device. For this reason, the preferred upper limit for the area reduction is 50%.

Thus, it should be apparent that there has been provided in accordance with the present invention a pneumatic seed delivery system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. For example, the cart illustrated in FIGS. 1 and 2 is supported by four wheels. Similar carts are supported by as few as two or three wheels. The cart of FIGS. 1 and 2 is shown as having only two bins with corresponding metering devices. Similar carts may have as many as four bins of which up to three may be provided with a mechanical metering device such as a metering cylinder and one to four may be provided with the improved pneumatic system described above. While the embodiment of FIGS. 1 and 2 shows a bin (with pneumatic or mechanical metering devices) separate from the planter and coupled thereto by a hitch, thus providing a three-implement assembly (tractor planter and cart), one implement may be eliminated by disposing the bins and their metering systems directly on the planter. This will allow farmers more maneuverability as is typically required for smaller acreage fields by eliminating the separate cart.

The embodiments of the invention in which an exclusive property or privilege is claimed are defined as follows:

1. A pneumatic seed delivery system comprising:
   a bin adapted to contain seed;
   a plenum disposed at a lower end of the bin;
   a semi-permeable membrane disposed between the plenum and the bin to permit the upward flow of air from the plenum into the bin;
   a first seed distribution tube extending through a side wall of the bin to provide fluid communication from an outer surface of the bin to an inner surface of the bin, wherein a first open end of the first seed distribution tube is disposed inside the bin and immediately adjacent to the membrane, and a second open end of the first seed distribution tube is disposed outside the bin.

2. The pneumatic seed delivery system of claim 1, further comprising a second seed distribution tube extending through the side wall of the bin to provide fluid communication from an outer surface of the bin to an inner surface of the bin, wherein a first open end of the second seed distribution tube is disposed inside the bin and adjacent to the membrane, and a second open end of the second seed distribution tube is disposed outside the bin, and wherein the first and second seed distribution tubes are adapted to be separately adjusted with respect to the membrane.

3. The pneumatic seed delivery system of claim 2, wherein the side wall is coupled to the plenum and membrane, and wherein the side wall, the plenum, and the membrane are removably coupled to the bin.

4. The pneumatic seed delivery system of claim 1, wherein the first seed distribution tube is disposed at an angle of between 20 and 60 degrees of horizontal.

5. The pneumatic seed delivery system of claim 1, wherein the first seed distribution tube is slidably supported in the side wall of the bin to allow the tube to be advanced toward or retracted from the membrane.

6. The pneumatic seed delivery system of claim 1, further comprising a flexible hose coupled to the first seed distribution tube and having an inner cross-sectional area smaller than an inner cross-sectional area of the first seed distribution tube.

7. The pneumatic seed delivery tube of claim 6, wherein the cross-sectional area of the flexible hose is at least 15% smaller than the cross-sectional area of the first seed distribution tube.

8. A pneumatic seed delivery system comprising:
   a bin adapted to contain seed;
   a plenum disposed at a lower end of the bin;
   a semi-permeable membrane disposed between the plenum and the bin to permit the upward flow of air from the plenum into the bin;
   a first seed distribution tube extending through a side wall of the bin to provide fluid communication from an outer surface of the bin to an inner surface of the bin, wherein a first open end of the first seed distribution tube is disposed inside the bin and immediately adjacent to the membrane, and a second open end of the first seed distribution tube is disposed outside the bin, wherein the first open end of the first seed distribution tube defines a first plane substantially parallel to the screen.

9. The pneumatic seed delivery system of claim 8, wherein the first open end of the first seed distribution tube defines a second plane substantially perpendicular to longitudinal axis of the tube.

10. The pneumatic seed delivery system of claim 9, further comprising at least two wheels rotationally coupled to and supporting the bin, thereby defining a cart having a front end and a rear end.

11. The pneumatic seed delivery system of claim 10, further comprising:
   a second bin coupled to the first bin to contain particulate matter;
   a metering cylinder coupled to a lower end of the second bin to meter particulate matter received from the second bin.

12. The pneumatic seed delivery system of claim 11, further comprising a longitudinal tubular member extending longitudinally between the front and the rear end of the cart below a lower portion of the first and second bins, wherein the metering cylinder is disposed below a lower portion of the second bin and above the longitudinal tubular member to meter particulate matter from the second bin into the longitudinal tubular member.

13. The pneumatic seed delivery system of claim 11, wherein the metering cylinder is adapted to meter particulate matter at a rate of between 0 and 300 pounds per minute, and the first seed distribution tube and membrane are adapted to meter seed at a rate of between 0 and 25 pounds per minute.

14. In a pneumatic distribution system for distributing particulate matter, the system including a bin having sloping internal side walls, a housing disposed at a lower end of the bin and coupled to the side walls of the bin to permit the passage of particulate matter from the bin into the housing, the housing having an opening in a side wall thereof, a removable insert comprising:
   a partition having an inner and an outer surface, a first opening configured to receive a particulate matter distribution tube and a second opening adapted to conduct an air flow through the partition from the outer surface to the inner surface;

a first panel coupled to and extending from the inner surface between the first and second openings and configured to be received in the housing opening and to abut an inner surface of the housing; and a membrane coupled to the panel and covering an opening in the panel.

15. The insert of claim 14 further comprising:

a flange coupled to the partition to seal the partition against the housing opening.

16. The insert of claim 14 further comprising two side panels and a bottom panel coupled to the partition to form a plenum together with the first panel, wherein the two side panels and the bottom panel are also configured to be receivable in the housing opening.

17. The insert of claim 14 wherein the partition has a third opening to receive a second distribution tube for conveying particulate matter.

18. The insert of claim 14 further comprising a distribution tube for particulate matter supported in the first opening in the partition and configured to be received in the housing opening.

19. The insert of claim 18 further comprising a particulate matter deflection plate disposed above an open end of the distribution tube.

20. The insert of claim 18 further comprising a flexible hose coupled to a distal end of the distribution tube and having an internal cross-sectional area at least 15% smaller than an internal cross-sectional area of the distribution tube.

21. In a pneumatic distribution system for distributing particulate matter, the system including a bin having sloping internal side walls, a housing disposed at a lower end of the bin and coupled to the side walls of the bin to permit the passage of particulate matter from the bin into the housing, the housing having an opening in a side wall thereof, a removable insert comprising:

a partition having an inner and an outer surface, a first opening configured to receive a particulate matter distribution tube and a second opening adapted to conduct an air flow through the partition from the outer surface to the inner surface;

a first panel coupled to and extending from the inner surface between the first and second openings and configured to be received in the housing opening and to abut an inner surface of the housing; and a membrane coupled to the panel and covering an opening in the panel, further comprising a latch for locking the insert into the housing opening.

22. A method of modifying a particulate matter distribution system having a bin, a housing coupled to a lower end of the bin, a cover covering an opening in the housing, and a metering device disposed within the housing, the method comprising the steps of:

removing the cover;

removing the metering device from the housing through the opening;

inserting into the opening a plenum having a membrane in a surface thereof; and providing in the housing a first end of a particulate matter distribution tube such that a first end of the distribution tube is disposed above the membrane.

23. The method of claim 22 further comprising the step of:

coupling a first end of a flexible hose to a second end of the distribution tube.

24. The method of claim 23 further comprising the step of:

coupling a second end of the flexible hose to a mechanical metering system on a planter.

25. A cart for receiving and distributing particulate matter, comprising:

at least one bin having sloping internal side walls and an opening at a lower portion thereof and configured to hold particulate matter;

a plurality of wheels configured to support the at least one bin;

at least one housing disposed below said opening and adapted to receive particulate matter passing through said opening from said bin and configured to hold both a rotating structure to meter particulate matter and a grain distribution tube disposed to receive particulate matter levitated by air.

26. A method of reconfiguring a particulate matter distribution system having a bin and a housing coupled to a lower end of the bin, the method comprising the steps of:

removing a rotating metering device from the housing;

providing a first end of a particulate matter distribution tube and a membrane in the housing, wherein an open end of the distribution tube is disposed above a membrane in the housing.

27. The method of claim 26, wherein the step of removing further includes the step of removing the rotating metering device from the housing through an opening in the housing, and the step of providing includes the step of inserting the first end of the distribution tube and at least a portion of the membrane into the opening.

28. A particulate matter distribution system comprising:

a first bin having sloping internal side walls and a first particulate matter outlet;

a rotating metering device having a meter outlet and disposed to receive grain passing out of the particulate matter outlet;

a second bin having sloping internal side walls and a second particulate matter outlet;

a first seed distribution tube having an open end disposed adjacent the first particulate matter outlet;

a fan disposed to provide a flow of air both to the meter outlet to move particulate matter from the first bin away from the meter outlet and to the open end of the distribution tube to carry particulate matter from the second bin through the distribution tube.

* * * * *